(12) United States Patent
Chi et al.

(10) Patent No.: US 12,318,991 B2
(45) Date of Patent: Jun. 3, 2025

(54) POUCH CASE MANUFACTURING DEVICE AND MANUFACTURING METHOD OF POUCH CASE

(71) Applicant: LG Energy Solution, Ltd., Seoul (KR)

(72) Inventors: Ho June Chi, Daejeon (KR); Hangjune Choi, Daejeon (KR); Jeong Oh Moon, Daejeon (KR); Dongyeon Kim, Daejeon (KR); Jinhak Kong, Daejeon (KR); Jin Yong Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 66 days.

(21) Appl. No.: 18/026,993

(22) PCT Filed: Nov. 15, 2021

(86) PCT No.: PCT/KR2021/016636
§ 371 (c)(1),
(2) Date: Mar. 17, 2023

(87) PCT Pub. No.: WO2022/103223
PCT Pub. Date: May 19, 2022

(65) Prior Publication Data
US 2023/0364850 A1 Nov. 16, 2023

(30) Foreign Application Priority Data
Nov. 16, 2020 (KR) .......................... 10-2020-0152523

(51) Int. Cl.
*B29C 51/08* (2006.01)
*H01M 50/105* (2021.01)
*B29L 31/34* (2006.01)

(52) U.S. Cl.
CPC ........... *B29C 51/08* (2013.01); *H01M 50/105* (2021.01); *B29L 2031/3468* (2013.01)

(58) Field of Classification Search
None
See application file for complete search history.

(56) References Cited

U.S. PATENT DOCUMENTS 8,047,834 B2    11/2011   Sofronie et al.
2012/0291512 A1*  11/2012   Kang ................ B21D 37/02
                                              72/466.8
(Continued)

FOREIGN PATENT DOCUMENTS

CN       201070653 Y    6/2008
CN       203304396 U    11/2013
(Continued)

OTHER PUBLICATIONS

Search report from International Application No. PCT/KR2021/016636, mailed Mar. 2, 2022.
(Continued)

*Primary Examiner* — Yung-Sheng M Tsui
(74) *Attorney, Agent, or Firm* — Lerner David LLP

(57) ABSTRACT

A pouch case manufacturing device pack according to an embodiment of the present disclosure includes a fixing unit that fixes a pouch film of a laminated sheet for battery cells; and a punch unit that presses the pouch film so as to form a storage part on the pouch film. The punch unit includes a central punch unit and an outer peripheral punch unit surrounding the central punch unit, the central punch unit presses the central portion of the pouch film, and the outer peripheral punch unit presses the outer peripheral portion of the pouch film. In in a vertical cross section parallel to the pressing direction of the punch unit, a radius of curvature of a corner of the central punch unit is larger than a radius of curvature of a corner of the outer peripheral punch unit.

13 Claims, 12 Drawing Sheets

(56) References Cited

U.S. PATENT DOCUMENTS

| | | |
|---|---|---|
| 2013/0256951 A1 | 10/2013 | Buehlmeyer et al. |
| 2015/0239029 A1 | 8/2015 | Yamamoto et al. |
| 2018/0205107 A1 | 7/2018 | Lee et al. |

FOREIGN PATENT DOCUMENTS

| | | | | |
|---|---|---|---|---|
| DE | 20319528 U1 | * | 4/2004 | ............ B29C 51/04 |
| EP | 2802023 A1 | | 11/2014 | |
| GB | 2230219 A | | 10/1990 | |
| JP | 2002263744 A | | 9/2002 | |
| JP | 2007326112 A | | 12/2007 | |
| JP | 2013154389 A | | 8/2013 | |
| JP | 2019038025 A | | 3/2019 | |
| JP | 2020179419 A | * | 11/2020 | |
| KR | 20140104538 A | | 8/2014 | |
| KR | 20140129831 A | | 11/2014 | |
| KR | 20160047569 A | | 5/2016 | |
| KR | 101644282 B1 | | 7/2016 | |
| KR | 20170124882 A | | 11/2017 | |
| KR | 20180085471 A | | 7/2018 | |

OTHER PUBLICATIONS

Extended European Search Report including Written Opinion for Application No. 21892390.2 dated May 21, 2024, pp. 1-15.
Partial European Search Report for European Patent Application No. 21892390.2 dated Jan. 8, 2024. 15 pages.

* cited by examiner

PRIOR ART

PRIOR ART

POUCH CASE MANUFACTURING DEVICE AND MANUFACTURING METHOD OF POUCH CASE

CROSS REFERENCE TO RELATED APPLICATIONS

This application is a national phase entry under 35 U.S.C. § 371 of International Application No. PCT/KR2021/016636 filed on Nov. 15, 2021, which claims the benefit of Korean Patent Application No. 10-2020-0152523 filed on Nov. 16, 2020 with the Korean Intellectual Property Office, the contents of which are incorporated herein by reference in entireties.

TECHNICAL FIELD

The present disclosure relates to a pouch case manufacturing device and a method for manufacturing a pouch case, and more particularly, to a pouch case manufacturing device using a deep drawing process, and a method for manufacturing a pouch case using same.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, along with the technology development and increased demand for mobile devices, demand for batteries as energy sources has been increasing rapidly, and accordingly, much research on batteries which can meet the various needs has been carried out.

Typically, the demand for the lithium secondary battery, such as a lithium ion battery or a lithium ion polymer battery, which have advantages such as a high energy density, a discharge voltage, an output stability, and the like is high.

The secondary battery may be classified based on the structure of an electrode assembly having a structure in which a cathode and an anode are stacked with a separator being interposed therebetween. Typically, there may be mentioned, for example, a jelly-roll type electrode assembly having a structure in which long sheets of cathodes and anodes are wound in the state in which a separator is interposed therebetween, a stacked type electrode assembly having a structure in which pluralities of cathodes and anodes, cut by a certain size unit, are sequentially stacked in the state in which separators are interposed therebetween, or the like. In recent years, in order to solve problems caused by the jelly-roll type electrode assembly and the stacked type electrode assembly, there has been developed a stacked/folded type electrode assembly, which is a combination of the jelly-roll type electrode assembly and the stacked type electrode assembly, having a structure in which unit cells stacked with predetermined units of the cathodes and the anodes are sequentially wound with a separator being interposed therebetween in the state of having been placed on a separation film.

Further, based on the shape of a battery case, the secondary battery may be classified into a cylindrical battery where an electrode assembly is mounted in a cylindrical case, a prismatic battery where an electrode assembly is mounted in a prismatic can, and a pouch type battery where an electrode assembly is mounted in a pouch type case of an aluminum laminate sheet.

Among these batteries, the pouch-shaped secondary battery, which can be stacked with high integration, has a high energy density per unit weight, is inexpensive, and can be easily modified, has attracted considerable attention. The pouch-type secondary battery means a battery cell in which the battery case is made of a laminated sheet including a resin layer and a metal layer, and has a structure in which an electrode assembly is mounted in the battery case.

FIG. 1 is a perspective view which shows a pouch case used in a pouch-type secondary battery.

Referring to FIG. 1, a pouch-type secondary battery can be manufactured by a process in which a recessed storage part S is formed in a pouch film F of a laminated sheet, an electrode assembly is stored in this storage part S, and an electrolyte solution is injected and then sealed.

At this time, in order to reduce the dead space in the pouch-type secondary battery, the storage part S may be formed on the pouch film F by using a deep drawing device. For reference, in order to form a flat metal plate into a circular cylindrical or square cylindrical product, it is necessary to perform the deep drawing process in which a sheet material is pushed into a die cavity using a punch. This processing method is called a deep drawing, in the sense that it can make products of which the inside is deep. It can also be applied to processing products with a thin depth, such as forming an electrode assembly storage part on a pouch film of a laminated sheet.

FIG. 2 is a cross-sectional view which explains a manufacturing process of a conventional deep drawing pouch case.

Referring to FIG. 2, the pouch film F is fixed between a lower die 21 and a stripper 22, and then a punch unit 30 having a shape corresponding to the storage part can press one surface of the pouch film F. In this manner, the storage part of the pouch case can be formed by a method of stretching the pouch film F to a desired depth using the punch unit 30 that presses downward.

FIG. 3 is a schematic diagram which shows a cross section of a pouch case in the process of manufacturing a pouch case by a conventional deep drawing process. Specifically, the boundary between the portion where the storage part is formed and the outer portion thereof is enlarged and shown.

Referring to FIGS. 2 and 3, when the conventional punch unit 30 presses the pouch film F to form the storage part, the "winding angle" at the boundary portion of the storage part is an important factor in determining the effective stretching degree of the pouch film F. At this time, the winding angle refers to an angle of an arc formed by the curvature at the boundary portion of the storage part formed by the corner portion of the punch unit 30.

When dynamically analyzed, as the winding angle increases, the difference in tensile force applied to the upper part (A portion) and the lower part (B part) of the part (C part) where frictional contact occurs between the punch unit 30 and the pouch film F increases exponentially.

In the conventional case, since the storage part S is formed by the pressing of the single punch unit 30, the winding angle of the pouch film becomes large, the tensile force applied to the upper part (part A) may be excessively large, so that tension of the pouch film F may occur only in the upper part (part A). As the stretching of the pouch film F is locally concentrated only on the upper part (part A) in this way, the average stretching rate increases, and the thickness of this part becomes excessively thin, and thus, the pouch film F may eventually break.

DETAILED DESCRIPTION OF THE INVENTION

Technical Problem

It is an object of the present disclosure to provide a pouch case manufacturing device that does not cause external defects or breakage of the pouch film while forming a storage part having a desired depth, and a manufacturing method of pouch case.

However, the problem to be solved by the embodiments of the present disclosure is not limited to the above-described problems, and can be variously expanded within the scope of the technical idea included in the present disclosure.

Technical Solution

According to an embodiment of the present disclosure, there is provided a pouch case manufacturing device comprising a fixing unit that fixes a pouch film of a laminated sheet for battery cells; and a punch unit that presses the pouch film so as to form a storage part on the pouch film. The punch unit includes a central punch unit and an outer peripheral punch unit surrounding the central punch unit, the central punch unit presses a central portion of the pouch film, and the outer peripheral punch unit presses an outer peripheral portion of the pouch film. In in a vertical cross section parallel to the pressing direction of the punch unit, a radius of curvature of a corner of the central punch unit is larger than a radius of curvature of a corner of the outer peripheral punch unit.

In a horizontal cross section perpendicular to the pressing direction of the punch unit, the radius of curvature of the corner of the central punch unit may be larger than the radius of curvature of the corner of the outer peripheral punch unit.

The outer peripheral punch unit may be composed of a plurality of units, and in a horizontal cross section perpendicular to the pressing direction of the punch unit, the plurality of the outer peripheral punch units may be sequentially disposed from the central punch unit to the outside.

The outer peripheral punch unit may include a first outer peripheral punch unit surrounding the central punch unit and a second outer peripheral punch unit surrounding the first outer peripheral punch unit.

In a vertical cross section parallel to the pressing direction of the punch unit, a radius of curvature of a corner of the first outer peripheral punch unit may be larger than a radius of curvature of a corner of the second outer peripheral punch unit.

In a horizontal cross section perpendicular to the pressing direction of the punch unit, a radius of curvature of a corner of the first outer peripheral punch unit may be larger than a radius of curvature of a corner of the second outer peripheral punched unit.

A thickness of the first outer peripheral punch unit may be thicker than a thickness of the second outer peripheral punch unit.

The pouch case manufacturing device may further include a driving unit that drives the punch unit so as to press the pouch film. The driving unit comprises a central cam unit located on the central punch unit; an outer peripheral cam unit located on the outer peripheral punch unit; and a camshaft unit connected to each of the central cam unit and the outer peripheral cam unit, and the cam operating angle of the central cam unit is larger than the cam operating angle of the outer peripheral cam unit.

According to another embodiment of the present disclosure, there is provided a method for manufacturing a pouch case, comprising the steps of: fixing a pouch film of a laminated sheet for battery cells; and pressing the fixed pouch film with a punch unit to form a storage part. The punch unit includes a central punch unit and an outer peripheral punch unit surrounding the central punch unit. In the step of forming the storage part, the central punch unit presses the central portion of the pouch film, and the outer peripheral punch unit presses the outer peripheral portion of the pouch film. In a vertical cross section parallel to the pressing direction of the punch unit, the radius of curvature of the corner of the central punch unit is larger than the radius of curvature of the corner of the outer peripheral punch unit.

In a horizontal cross section perpendicular to the pressing direction of the punch unit, the radius of curvature of the corner of the central punch unit may be larger than the radius of curvature of the corner of the outer peripheral punch unit.

In the step of forming the storage part, first, the central punch unit presses the central portion of the pouch film, and then the outer peripheral punch unit may press the outer peripheral portion of the pouch film.

The outer peripheral punch unit may be composed of a plurality of units, and in a horizontal cross section perpendicular to the pressing direction of the punch unit, the plurality of the outer peripheral punch units may be sequentially disposed from the central punch unit to the outside.

In the step of forming storage part, among the plurality of the outer peripheral punch units, an outer peripheral punch unit located close to the central punch unit may press the pouch film before an outer peripheral punch unit located far from the central punch unit.

Advantageous Effects

According to the embodiments of the present disclosure, a coaxial punch unit composed of a combination of a plurality of punch units is provided, and a radius of curvature of the punch unit is adjusted, whereby in the step of forming the storage part by the punch unit, the pouch film can be stretched in a relatively uniform form in a wide area.

Thereby, it is possible to prevent local stretching of the pouch film and reduce the average stretching rate, and thus prevent external defects such as cracks in the pouch film or breaks of the pouch film.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
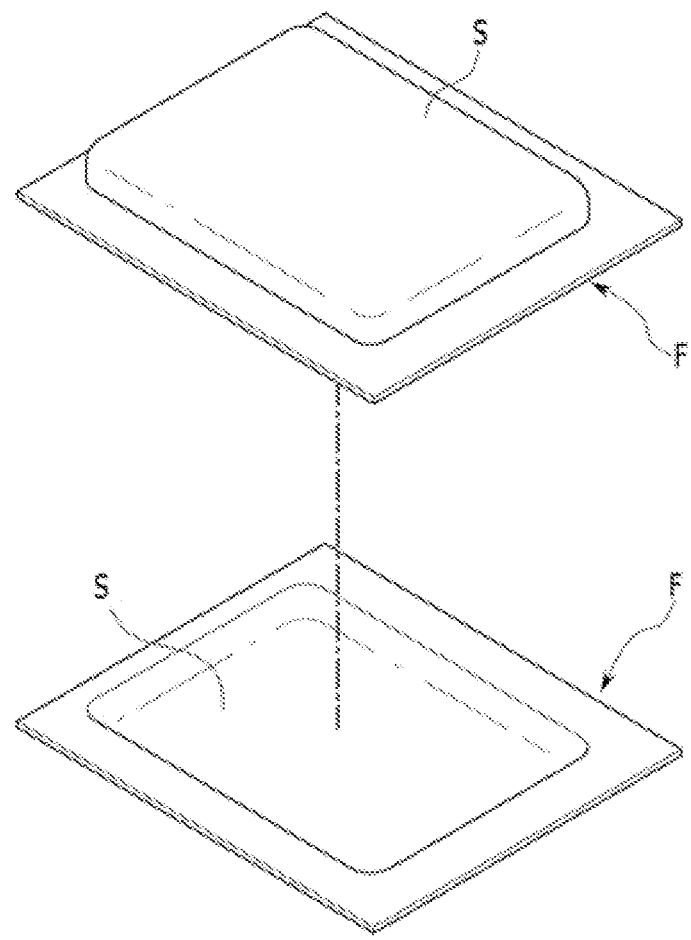
FIG. 1 is a perspective view which shows a pouch case used in a pouch-type secondary battery.
Figure 2:
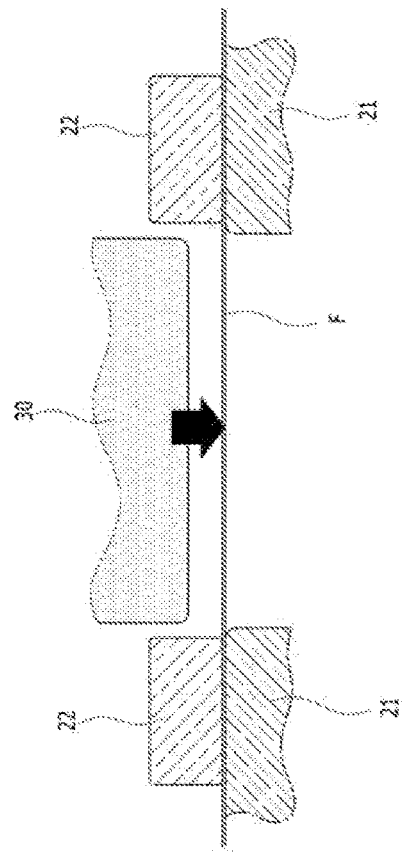
FIG. 2 is a cross-sectional view which explains a manufacturing process of a conventional deep drawing pouch case.

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 4:
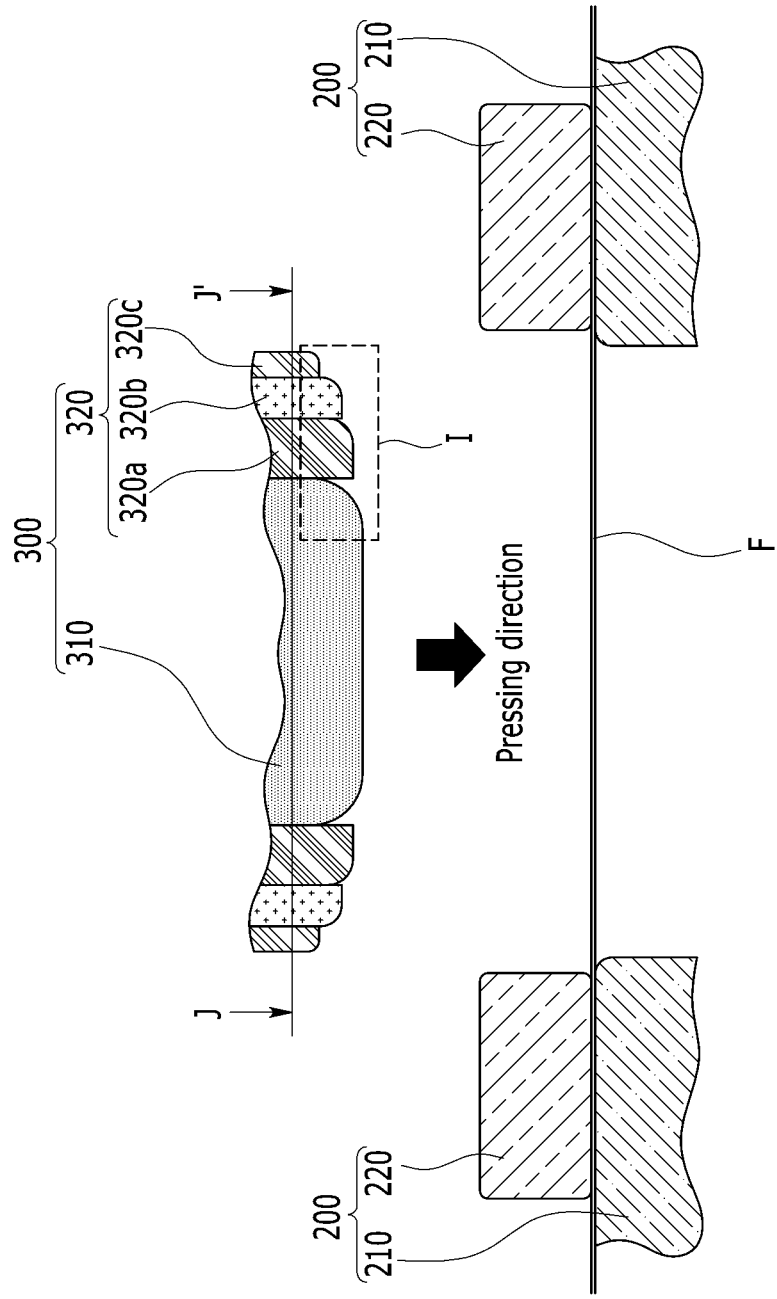
FIG. 4 is a cross-sectional view which shows a vertical section of the pouch case manufacturing device according to an embodiment of the present disclosure.
Figure 5:
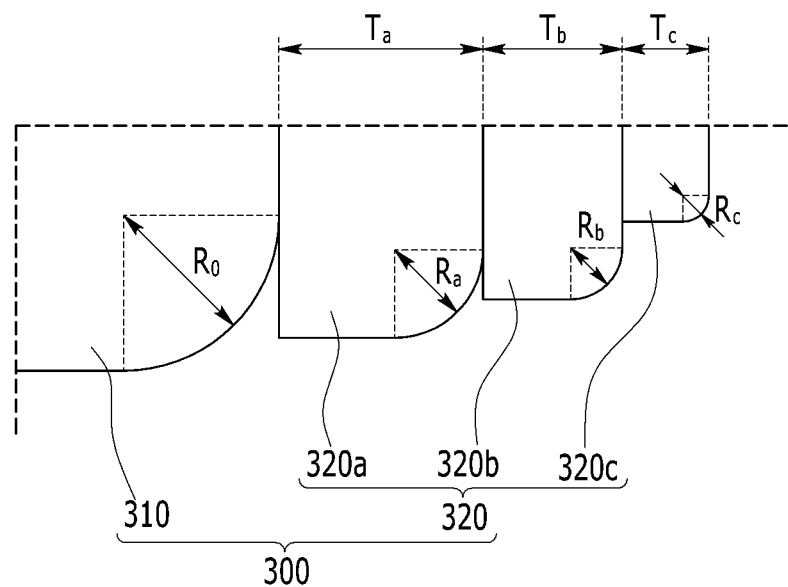
FIG. 5 is a partial view which shows an enlarged portion "I" of FIG. 4.
Figure 6:
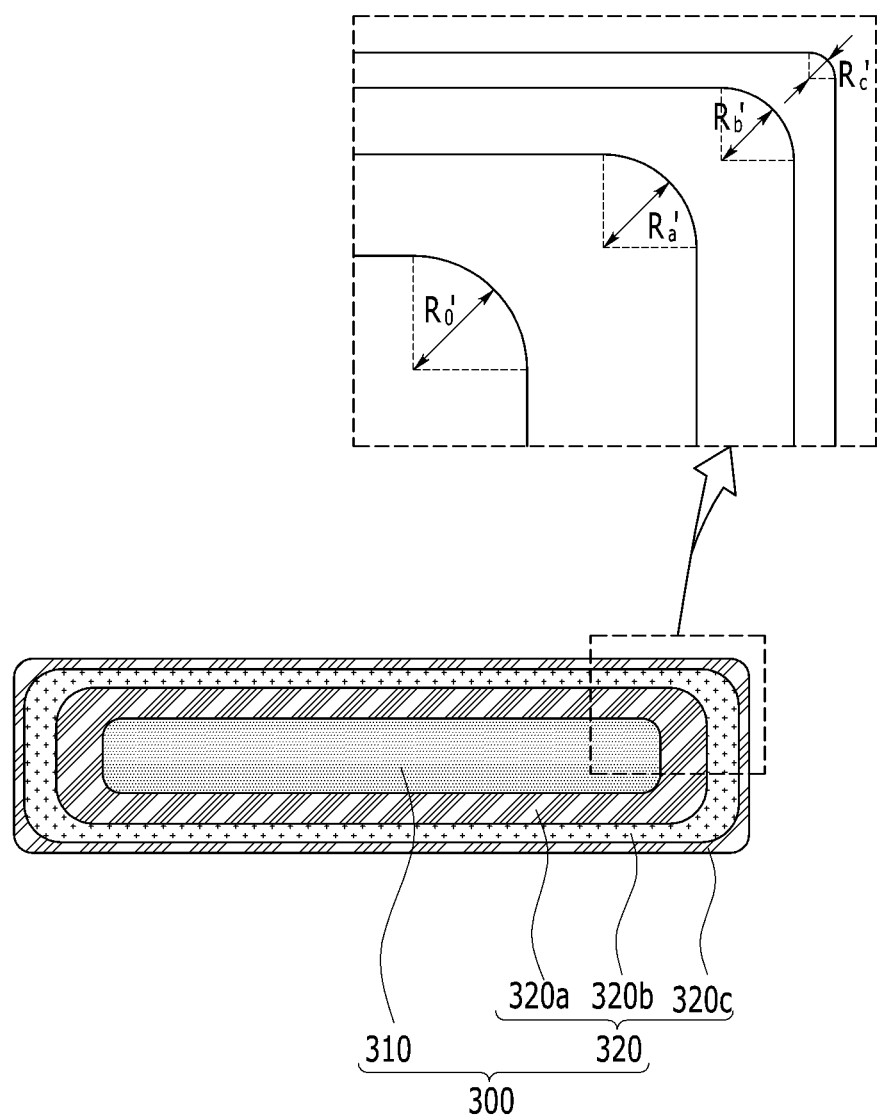
FIG. 6 is a cross-sectional view which shows a cross section corresponding to the cut line J-J' of FIG. 4.

FIG. 4 is a cross-sectional view which shows a vertical section of the pouch case manufacturing device according to an embodiment of the present disclosure. FIG. 5 is a partial view which shows an enlarged portion "I" of FIG. 4. FIG. 6 is a cross-sectional view which shows a cross section corresponding to the cut line J-J' of FIG. 4.

Referring to FIGS. 4 to 6, a pouch case manufacturing device according to an embodiment of the present disclosure includes a fixing unit 200 that fixes the pouch film F of the laminated sheet for battery cells and a punch unit 300 that presses the pouch film F so as to form a storage part in the pouch film F. The punch unit 300 includes a central punch unit 310 and an outer peripheral punch unit 320 surrounding the central punch unit 310. The central punch unit 310 and the outer peripheral punch unit 320 are punches that are coaxial with each other, wherein the central punch unit 310 presses the central portion of the pouch film F, and the outer peripheral punch unit 320 presses the outer peripheral portion of the pouch film F.

First, the fixing unit 200 according to the present embodiment may include a lower die 210 and a stripper 220. The lower die 210 is a structure in which a space having a shape corresponding to the storage part S (see FIG. 1) is provided while supporting the outer peripheral side of the pouch film F, and the stripper 220 is a structure for fixing the pouch film F on the lower die 210. That is, the outer peripheral side of the pouch film F may be fixed while being located between the lower die 210 and the stripper 220.

The punch unit 300 may form a storage part in the pouch film F by a deep drawing process of pressing a portion of the fixed pouch film F where the storage part is formed. The punch unit 300 is not a single punch unit, but includes a plurality of punches in which the central punch unit 310 and the outer peripheral punch unit 320 are coaxial with each other.

Meanwhile, the outer peripheral punch unit 320 may be configured in a single number or in plural numbers. The number of the outer peripheral punch unit 320 is not particularly limited. FIGS. 4 to 6 show that the outer peripheral punch unit 320 is configured in plural numbers and includes a first outer peripheral punch unit 320a, a second outer peripheral punch unit 320b, and a third outer peripheral punch unit 320c. That is, the outer peripheral punch unit 320 may include a first outer peripheral punch unit 320a surrounding the central punch unit 310, a second outer peripheral punch unit 320b surrounding the first outer peripheral punch unit 320a and a third outer peripheral punch unit 320c surrounding the second outer peripheral punch unit 320b.

When the outer peripheral punch unit 320 is configured in plural numbers, the plurality of outer peripheral punch units in a horizontal cross section perpendicular to the pressing direction of the punch unit 300 may be sequentially located from the central punch unit 310 to the outside. With respect to the pressing direction of the punch unit 300, each of the central punch unit 310 and the outer peripheral punch unit 320 may face the pouch film F. Here, the pressing direction of the punch unit 300 means a direction in which the punch unit 300 faces the pouch film F, as shown in FIG. 4. Therefore, the horizontal cross section may be a surface parallel to one surface of the pouch film F before pressing.

At this time, as shown in FIGS. 4 and 5, in a vertical cross section parallel to the pressing direction of the punch unit 300, the radius of curvature $R_O$ of a corner of the central punch unit 310 may be larger than the radii of curvature $R_a$, $R_b$, and $R_c$ of a corner of the outer peripheral punch unit 320. The vertical cross section may be a surface perpendicular to one surface of the pouch film F before pressing. Further, the radius of curvature means a radius of a circular arc formed by a corner portion on a vertical cross section of each punch unit. The radius of curvature being large means that the corner portion in the vertical cross section of each punch unit has a gentle curvature.

Specifically, in a vertical cross section parallel to the pressing direction of the punch unit 300, the radius of curvature $R_0$ of the corner of the central punch unit 310 may be larger than the radius of curvature $R_a$ of the corner of the first outer peripheral punch unit 320a, the radius of curvature $R_a$ of the corner of the first outer peripheral punch unit 320a may be larger than the radius of curvature $R_b$ of the corner of the second outer peripheral punch unit 320b, and the radius of curvature $R_b$ of the corner of the second outer peripheral punch unit 320b may be larger than the radius of curvature $R_c$ of the corner of the third outer peripheral punch unit 320c. That is, in other words, the radius of curvature of the corners of the punch units in a vertical cross section increases as it goes from the central punch unit 310 toward the outside, and the corner portion may form a steep curvature.

FIG. 6 is a cross-sectional view which shows a cross section corresponding to the cut line J-J' of FIG. 4. That is, FIG. 6 is a cross-sectional view of the punch unit 300 according to the present embodiment taken along a horizontal cross section perpendicular to the pressing direction of the punch unit 300.

Referring to FIGS. 4 and 6, the state of the outer peripheral punch unit 320 surrounding the central punch unit 310 can be confirmed as described above. At this time, in a horizontal cross section perpendicular to the pressing direction of the punch unit 300, the radius of curvature $R_0'$ of the corner of the central punch unit 310 may be larger than the radius of curvature $R_a'$, $R_b'$ and $R_c'$ of the corner of the outer peripheral punch unit 320. The horizontal cross-section may be a surface parallel to one surface of the pouch film F before pressing, as described above. Further, the radius of curvature means a radius of a circular arc formed by a corner portion in a horizontal cross section of each punch unit. The radius of curvature being large means that the corner portion in the horizontal cross section of each punch has a gentle curvature.

Specifically, in a horizontal cross section perpendicular to the pressing direction of the punch unit 300, the radius of curvature $R_0'$ of the corner of the central punch unit 310 may be larger than the radius of curvature $R_a$ of the corner of the first outer peripheral punch unit 320a, the radius of curvature $R_a$ of the corner of the first outer peripheral punch unit 320a may be larger than the radius of curvature $R_b'$ of the corner of the second outer peripheral punch unit 320b, and the radius of curvature $R_b'$ of the corner of the second outer peripheral punch unit 320b may be larger than the radius of curvature $R_c'$ of the corner of the third outer peripheral punch unit 320c. That is, in other words, as it goes from the central punch unit 310 toward the outside, the radius of curvature of the corners of the punch units on the horizontal cross section becomes larger, and a corner portion may form a steep curvature.

That is, referring to FIGS. 4 to 6 together, the punch unit 300 according to an embodiment of the present disclosure may be configured such that the radius of curvature $R_0$ of the corner of the central punch unit 310 in a vertical cross section is larger than the radii of curvature $R_a$, $R_b$ and $R_c$ of the corner of the outer peripheral punch unit 320. Further, the punch unit 300 according to another embodiment of the present disclosure may be configured such that the radius of curvature $R_0$ of the corner of the central punch unit 310 in a vertical cross section is larger than the radii of curvature $R_a$, $R_b$ and $R_c$ of the corners of the outer peripheral punch unit 320, and at the same time, the radius of curvature $R_0'$ of the corner of the central punch unit 310 in a horizontal cross section may be larger than the radius of curvature $R_a'$, $R_b'$ and $R_c'$ of the corners of the outer peripheral punch unit 320.

Figure 7:
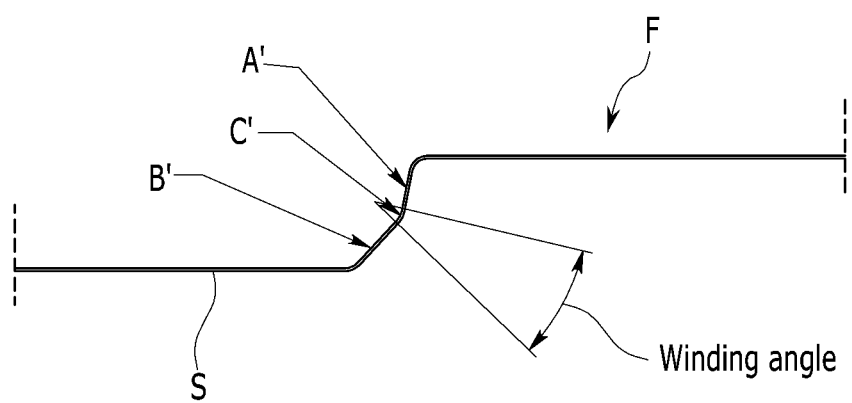
FIG. 7 is a schematic diagram which shows a cross section of a pouch case manufactured by the pouch case manufacturing device according to an embodiment of the present disclosure.

Next, the advantages of the punch unit 300 according to the present embodiment in comparison with the conventional punch unit 30 will be described together with FIG. 7 and the like. FIG. 7 is a schematic diagram which shows a cross section of a pouch case manufactured by the pouch case manufacturing device according to an embodiment of the present disclosure.

Figure 3:
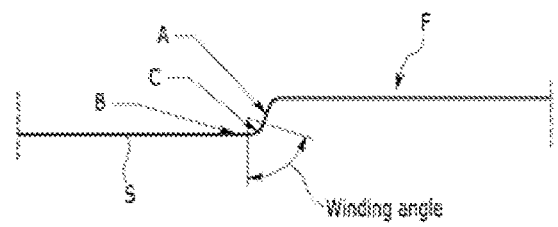
FIG. 3 is a schematic diagram which shows a cross section of a pouch case in the process of manufacturing a pouch case by a conventional deep drawing process.

First, referring to FIG. 3 again, as described above, the conventional punch unit 30 is composed of a single punch unit, and the pouch film F is pressed to a desired depth at once to form the storage unit S. Therefore, a large winding angle is formed, the tensile force applied to the upper part (part A) becomes excessively large, and local stretching and breakage of the pouch film F may occur.

Meanwhile, referring to FIGS. 4 to 6, the punch unit 300 according to the present embodiment includes a plurality of punches coaxial with each other, that is, a central punch unit 310 and an outer peripheral punch unit 320. Further, the outer peripheral punch unit 320 may also be configured in plural numbers. Since a plurality of punches coaxial with each other press the pouch film F in sequence as described above, the storage part S can be gradually formed to a desired depth. That is, the storage part S can be formed by gradually expanding the area of the storage part S to the boundary portion where the storage part S is formed, rather than forming the storage part S by pressing at once. Here, the boundary portion means a boundary between a portion of the pouch film F in which the storage part S is formed and a portion in which the storage part S is not formed.

Meanwhile, the punch unit 300 according to the present embodiment has a structure in which the radius of curvature of the corner on the vertical section increases as it goes from the outermost peripheral punch unit (meaning 320c in FIG. 4 and the like) toward the central punch unit 310. In such a structure, the pressing of the central punch unit 310 is performed first, and then the pressing of the outer peripheral punch unit 320 may be performed. When the outer peripheral punch units 320 are composed of a plurality of units, pressing may be performed sequentially from the outer peripheral punch unit close to the central punch unit 310. In this case, a structure in which the corners of the central punch unit 310 and the outer peripheral punch unit 320 have the same radius of curvature may be compared as a comparative example. If they all have the same radius of curvature, the pouch film F is stretched to a certain depth at once each time the central punch unit 310 and the outer peripheral punch unit 320 are pressed. In this case, the winding angle is large and the stretching may be excessively concentrated only on a specific part, and naturally, the possibility of occurrence of cracks, breaks or the like increases. Meanwhile, if the radius of curvature of each corner of the punch units is set to be larger toward the center as in the present embodiment, the effect of gradually stretching the portion of the pouch film F corresponding to the corners of the punch units can be realized. Since stretching is not performed to a certain depth at once, stretching of a uniform shape as a whole can be performed rather than local stretching of only a specific part. The possibility of occurrence of cracks, breaks or the like can be greatly reduced.

In addition, in the formation of the boundary portion of the storage part (S) where cracks or breaks are most likely to occur, if a plurality of outer peripheral punch units are configured like the first to third outer peripheral punch units 320a, 320b and 320c, the stretching of the pouch film F adjacent to the boundary portion of the storage part S may be performed more gradually. That is, the first outer peripheral punch unit 320a having a relatively large radius of curvature primarily little presses the pouch film F at the boundary portion of the storage part S, and then, the second outer peripheral punch unit 320b and the third outer peripheral punch unit 320c having a gradually smaller radius of curvature may sequentially press the pouch film F at the boundary of the storage part S. In this way, uniform stretching can be induced while forming the storage part to a desired depth.

Explaining again along with FIG. 7, it can be confirmed that the pouch film F is gradually stretched at the boundary portion of the storage part S. That is, by reducing the winding angle in the stretching process of the pouch film F, the difference in tensile force applied to the upper part (A' part) and the lower part (B' part) of the part (C' part) where frictional contact occurs between the punch unit 300 and the pouch film F can be reduced. Since the stretching of the pouch film F occurs evenly in both the upper part (A' part) and the lower part (B' part), it is possible to reduce the average stretching ratio and prevent excessive stretching from being concentrated locally.

Meanwhile, similarly to FIG. 6, a similar effect can also be realized by configuring the corners on the horizontal cross section so that the radius of curvature becomes smaller from the center toward the outside. Since the pouch film F can be induced to be gradually stretched in forming the corners of the storage part S (see FIG. 1), the pouch film F is similarly stretched in a uniform form, and the possibility of cracks and breaks can be significantly reduced.

Meanwhile, referring to FIG. 5 again, the thickness $T_a$ of the first outer peripheral punch unit 320a may be thicker than the thickness $T_b$ of the second outer peripheral punch unit 320b. Further, the thickness $T_b$ of the second outer peripheral punch unit 320b may be thicker than the thickness $T_c$ of the third outer peripheral punch unit 320c. That is, when the outer peripheral punch unit 320 is composed of a plurality of units, the thickness may become thinner as the distance from the central punch portion 310 increases. If the radius of curvature of the corner of the outer peripheral punch unit on the vertical cross section or the horizontal cross section is set smaller as the distance from the central punch portion 310 increases and at the same time, the thickness of the outer peripheral punch unit is set thinner as the distance from the central punch unit 310 increases, stretching of the pouch film F corresponding to the boundary portion of the storage part S can be performed in a more subdivided manner. This may help uniform stretching of the pouch film F at the boundary portion.

Figure 8:
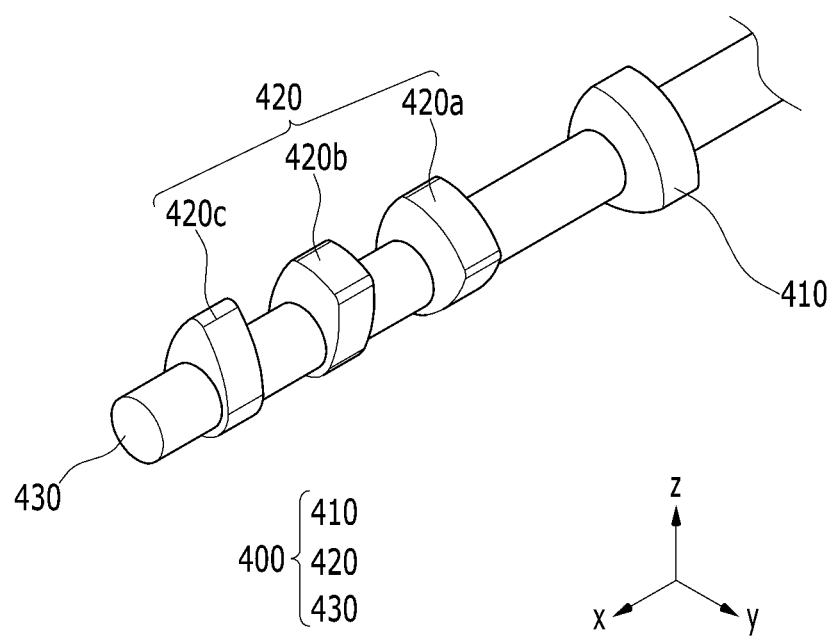
FIG. 8 is a perspective view which shows a driving unit according to an embodiment of the present disclosure.
Figure 9:
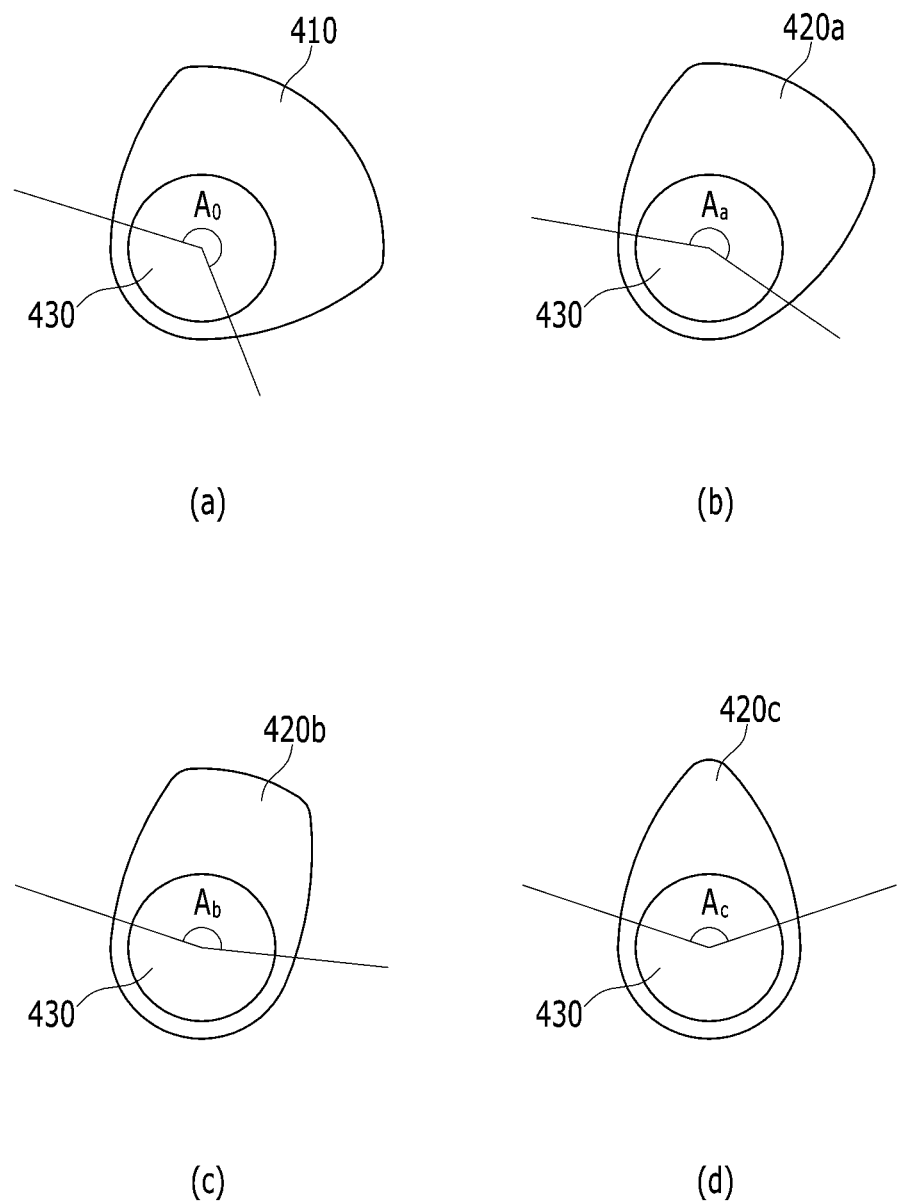
FIGS. 9a to 9d are cross-sectional views which show cross-sections on the yz plane of the central cam unit and the first to third outer peripheral cam units included in the driving unit of FIG. 8, respectively.

FIG. 8 is a perspective view which shows a driving unit according to an embodiment of the present disclosure.

Referring to FIGS. 4 and 8, the pouch case manufacturing device according to an embodiment of the present disclosure may further include a driving unit 400 that drives the punch unit 300 to press the pouch film F.

Specifically, the driving unit 400 may include a central cam unit 410 located on the central punch unit 310, an outer peripheral cam unit 420 located on the outer peripheral punch unit 320, and a camshaft unit 430 connected to each of the central cam unit 410 and the outer peripheral cam unit 420. The driving unit 400 is located on the punch unit 300 and can push the punch unit 300 in the direction of the pouch film F. That is, the rotational motion of the camshaft unit 430 may be switched to the up and down motion of the punch units 300 by the central cam unit 410 and the outer peripheral cam unit 420.

The camshaft unit 430 is a rod-shaped member, and can rotate the central cam unit 410 and the outer peripheral cam unit 420.

The outer peripheral cam unit 420 can be configured to match the number of the outer peripheral punch units 320. As an example, when the outer peripheral punch unit 320 is composed of the first to third outer peripheral punch units 320a, 320b and 320c, the first to third outer peripheral cam units 420a, 420b and 420c can be located at the upper part of each of the first to third outer peripheral punch units 320a, 320b and 320c.

FIGS. 9a to 9d are cross-sectional views which show cross-sections on the yz plane of the central cam unit and the first to third outer peripheral cam units included in the driving unit of FIG. 8, respectively.

Referring to FIGS. 8 and 9a to 9d, the cam operating angle $A_O$ of the central cam unit 410 may be larger than the cam operating angles $A_a$, $A_b$ and $A_c$ of the outer peripheral cam unit 420. In other words, the central cam unit 410 may form a wider cam operating angle as compared with the other first to third outer peripheral cam units 420a, 420b and 420c. The cam operating angle is an angle corresponding to a region where a cam nose of each cam unit is formed, and is a value corresponding to a length of a section in which the up and down movement of the punch units 300 can occur when the cam unit rotates. That is, the wide cam operating angle means that the pressing time of the corresponding punch unit is long. Since the cam operating angle $A_O$ of the central cam unit 410 is the widest, the corresponding central punch unit 310 can be pressed for the longest time.

Meanwhile, the cam operating angle $A_a$ of the first outer peripheral cam unit 420a may be larger than the cam operation angle $A_b$ of the second outer peripheral cam unit 420b, and the cam operating angle $A_b$ of the second outer peripheral cam unit 420b may be larger than the cam operating angle $A_c$ of the third outer peripheral cam unit 420c. That is, among the first to third outer peripheral punch units 320a, 320b and 320c, the first outer peripheral punch unit 320a corresponding to the first outer peripheral cam unit 420a is pressed for the longest time, and the third outer peripheral punch unit 320c corresponding to the third outer peripheral cam unit 420c may be pressed for the shortest time.

By adjusting the angle of the central cam unit 410 and the first to third outer peripheral cam units 420a, 420b and 420c, the central punch unit 310 first presses the pouch film F, and then the first to third outer peripheral punch units 320a, 320b and 320c can sequentially press the pouch film F to set the pouch case manufacturing device. The driving state of the central punch unit 310 and the first to third outer peripheral punch units 320a, 320b and 320c will be described in detail with reference to FIGS. 10 to 13 below.

Next, a method for manufacturing a pouch case according to an embodiment of the present disclosure will be described in detail. Specifically, it may be a pouch case manufacturing method using the above-mentioned pouch case manufacturing device.

First, the method for manufacturing a pouch case according to an embodiment of the present disclosure includes the steps of: fixing the pouch film F of a laminated sheet for battery cells; and pressing the fixed pouch film F with a punch unit 300 to form a storage part S. The punch unit 300 includes a central punch unit 310 and an outer peripheral punch unit 320 surrounding the central punch unit 310. In the step of forming the storage part S, the central punch unit 310 presses the central portion of the pouch film F, and the outer peripheral punch unit 320 presses the outer peripheral portion of the pouch film F.

At this time, as shown in FIG. 5, in a vertical cross section parallel to the pressing direction of the punch unit 300, the radius of curvature $R_0$ of the corner of the central punch unit 310 is larger than the radii of curvature $R_a$, $R_b$ and $R_c$ of the corners of the outer peripheral punch unit 320. Further, as shown in FIG. 6, in a horizontal cross section perpendicular to the pressing direction of the punch unit 300, the radius of curvature $R_0'$ of the corner of the central punch unit 310 may be larger than the radii of curvature $R_a'$, $R_b'$ and $R_c'$ of the corners of the outer peripheral punch unit 320. A detailed description thereof will be omitted since it overlaps with the contents described above.

In the step of fixing the pouch film F, the outer peripheral side of the pouch film F can be fixed while being located between the lower die 210 and the stripper 220, as described above.

Meanwhile, in the step of forming the storage part S, first, the central punch unit 310 may press the central portion of the pouch film F, and then the outer peripheral punch unit 320 may press the outer peripheral portion of the pouch film.

When the outer peripheral punch unit 320 is composed of a plurality of units, in a horizontal cross section perpendicular to the pressing direction of the punch unit 300, the plurality of outer peripheral punch units 320 may be sequentially located from the central punch unit 310 to the outside. At this time, in the step of forming the storage part S, among the plurality of outer peripheral punch units 320, the outer peripheral punch unit located close to the central punch unit 310 can press a pouch film F before the outer peripheral punch unit located far from the central punch unit 310.

Next, the pressing order of the central punch unit 310 and the outer peripheral punch unit 320 will be described in detail with reference to FIGS. 10 to 13.

FIGS. 10 to 13 are cross-sectional views which explain a method for manufacturing a pouch case according to an embodiment of the present disclosure.

Figure 10:
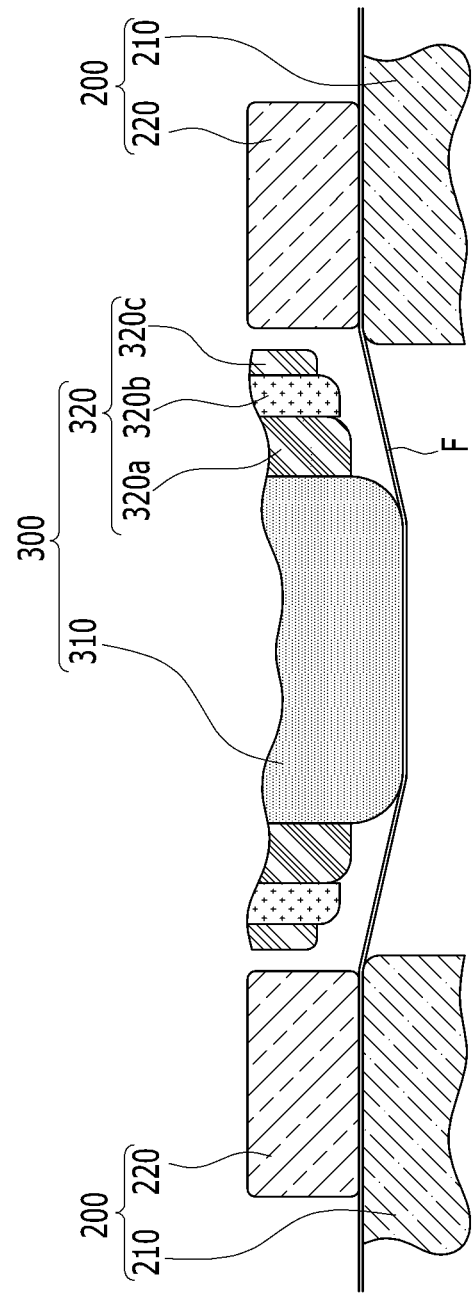
FIGS. 10 to 13 are cross-sectional views which explain a method for manufacturing a pouch case according to an embodiment of the present disclosure.

First, referring to FIG. 10, among the punch units 300 according to the present embodiment, the central punch unit 310 can press the fixed pouch film F while facing downward at the very first.

Figure 11:
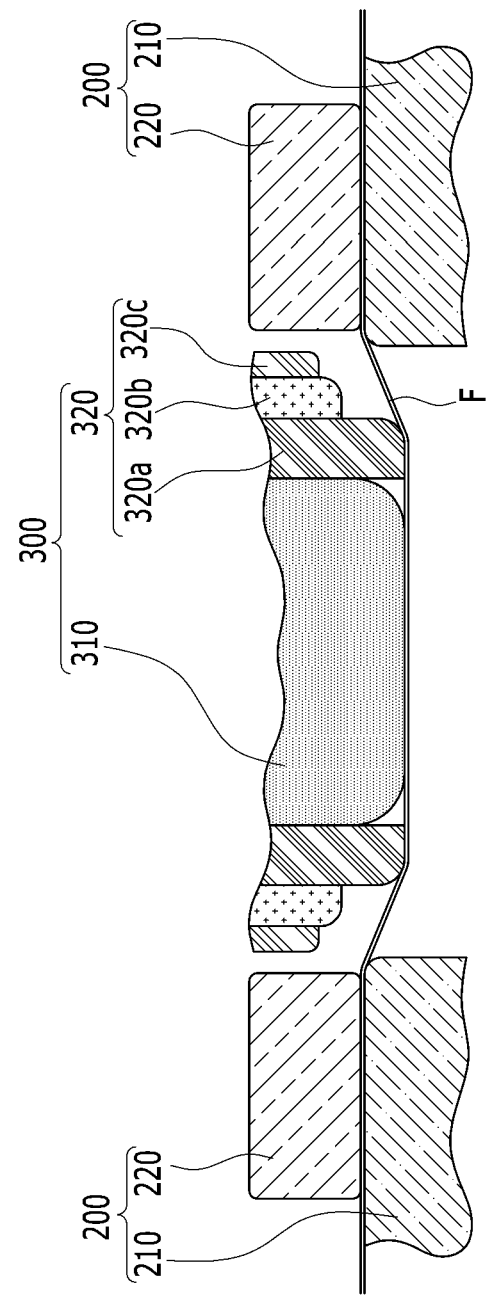

Next, referring to FIG. 11, in a state in which the central punch unit 310 faces downward, it is possible to press the pouch film F while the first outer peripheral punch unit 320a faces downward.

Figure 12:
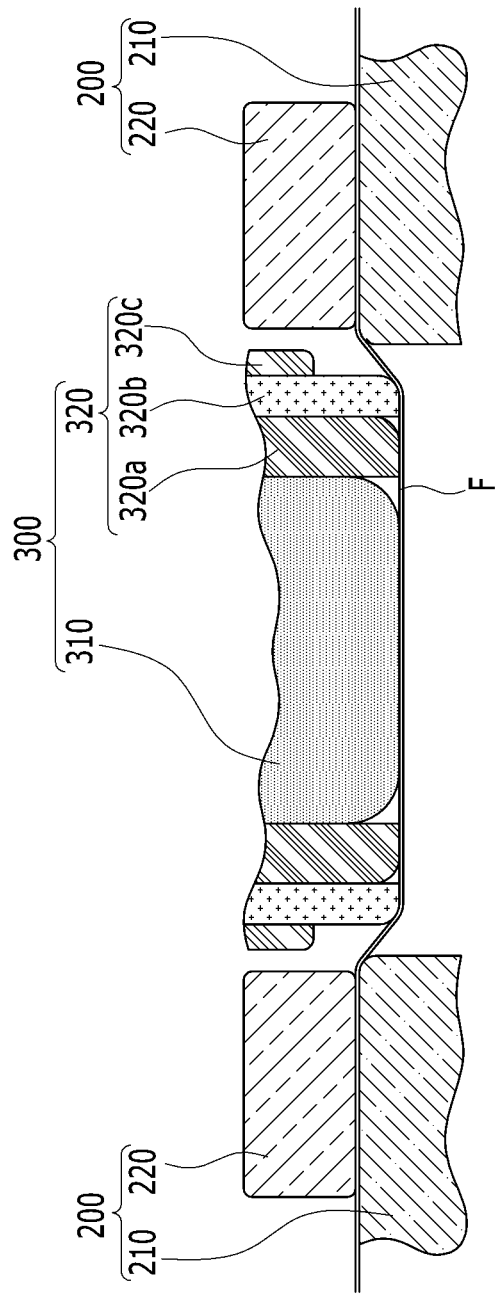

Next, referring to FIG. 12, in a state in which the central punch unit 310 and the first outer peripheral punch unit 320a face downward, it is possible to press the pouch film F while the second outer peripheral punch unit 320b face downward.

Figure 13:
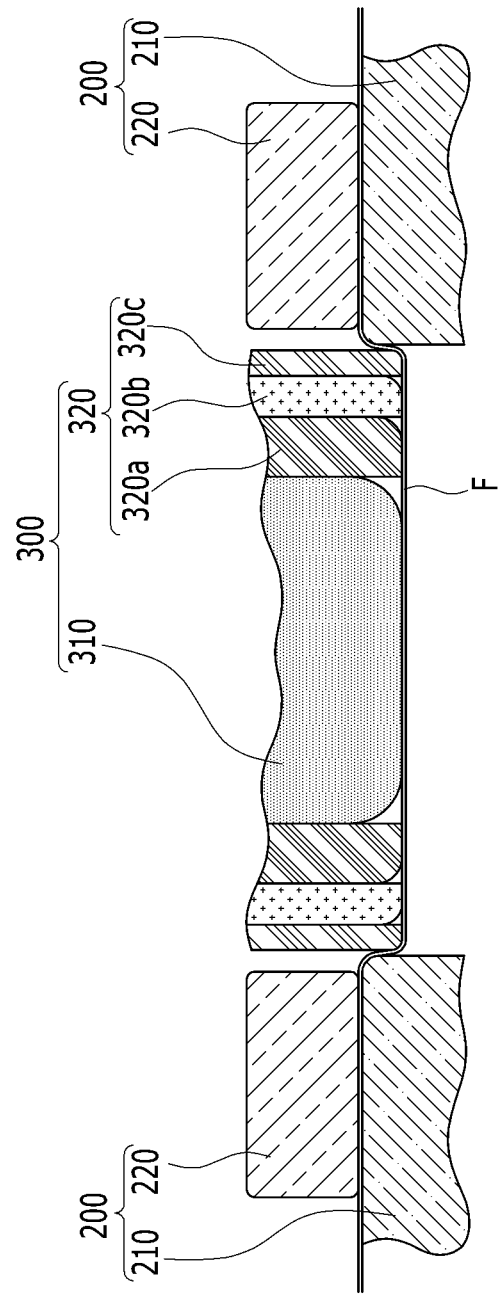

Next, referring to FIG. 13, in a state in which the central punch unit 310, the first outer peripheral punch unit 320a, and the second outer peripheral punch unit 320b face downward, it is possible to press the pouch film F while the third peripheral punch unit 320c faces downward. As the third outer peripheral punch unit 320c finally presses the outermost boundary portion of the region where the storage unit is formed, thereby completing the manufacture of the pouch case.

That is, as sequentially shown in FIGS. 10 to 13, the central punch unit 310 and the first to third outer peripheral punch units 320a, 320b and 320c can sequentially face downward to press the pouch film F. That is, in a state where the central punch unit 310 having the largest radius of curvature of the corner on the vertical cross section presses the central portion of the pouch film F, the first to third outer peripheral punch units 320a, 320b and 320c, in which the radius of curvature of the corner on the vertical cross section gradually decreases, may form the storage part in such a way that the portion extending from the central portion is gradually widened. Since the pouch film F is gradually stretched rather than being stretched to a certain depth at once, stretching in a uniform form as a whole may be achieved rather than local stretching of only a specific part.

A method in which the central punch unit 310, the first to third outer peripheral punch units 320a, 320b and 320c face downward in sequence can be performed by disposing the central cam unit 410 and the first to third outer peripheral cam units 420a, 420b and 420c on the upper part of each of the central punch unit 310 and the first to third outer peripheral punch units 320a, 320b and 320c as described above with reference to FIGS. 8 and 9. However, the driving method by the driving unit 400 including the central cam unit 410 and the first to third outer peripheral cam units 420a, 420b and 420c corresponds to one example. If the central punch unit 310, the first to third outer peripheral punch units 320a, 320b and 320c can face downward in sequence, the method is not particularly limited. That is, a method such as NC (Numerical Control) Servo control, not the phase difference method of the cam unit, may be performed.

Although the terms representing directions such as front, rear, left, right, upper and lower directions are used herein, these merely represent for convenience of explanation, and may differ depending on a position of an object, a position of an observer, or the like.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

200: fixing unit
300: punch unit
310: central punch unit
320: outer periphery punch unit
400: driving unit

The invention claimed is:

1. A battery pouch case manufacturing device, comprising:
    a fixing unit that fixes a pouch film of a laminated sheet for battery cells; and
    a punch unit that presses the pouch film so as to form a storage part on the pouch film,
    wherein the punch unit comprises a central punch unit and an outer peripheral punch unit surrounding the central punch unit,
    wherein the central punch unit presses a central portion of the pouch film, and the outer peripheral punch unit presses an outer peripheral portion of the pouch film, and
    wherein in a vertical cross section parallel to a pressing direction of the punch unit, a radius of curvature of a corner of the central punch unit is larger than a radius of curvature of a corner of the outer peripheral punch unit.

2. The pouch case manufacturing device according to claim 1, wherein:

in a horizontal cross section perpendicular to the pressing direction of the punch unit, the radius of curvature of the corner of the central punch unit is larger than the radius of curvature of the corner of the outer peripheral punch unit.

3. The pouch case manufacturing device according to claim 1, wherein:

the outer peripheral punch unit is composed of a plurality of units, and in a horizontal cross section perpendicular to the pressing direction of the punch unit, the plurality of the outer peripheral punch units are sequentially disposed from the central punch unit to an outside.

4. The pouch case manufacturing device according to claim 1, wherein:

the outer peripheral punch unit comprises a first outer peripheral punch unit surrounding the central punch unit and a second outer peripheral punch unit surrounding the first outer peripheral punch unit.

5. The pouch case manufacturing device according to claim 4, wherein:

in the vertical cross section parallel to the pressing direction of the punch unit, a radius of curvature of a corner of the first outer peripheral punch unit is larger than a radius of curvature of a corner of the second outer peripheral punch part.

6. The pouch case manufacturing device according to claim 4, wherein:

in a horizontal cross section perpendicular to the pressing direction of the punch unit, a radius of curvature of a corner of the first outer peripheral punch unit is larger than a radius of curvature of a corner of the second outer peripheral punch part.

7. The pouch case manufacturing device according to claim 4, wherein:

a thickness of the first outer peripheral punch unit is thicker than a thickness of the second outer peripheral punch unit.

8. The pouch case manufacturing device according to claim 1, which further comprises a driving unit that drives the punch unit so as to press the pouch film, wherein the driving unit comprises a central cam unit located on the central punch unit; an outer peripheral cam unit located on the outer peripheral punch unit; and a camshaft unit connected to each of the central cam unit and the outer peripheral cam unit, and wherein a cam operating angle of the central cam unit is larger than a cam operating angle of the outer peripheral cam unit.

9. A method for manufacturing a battery pouch case, comprising the steps of:

fixing a pouch film of a laminated sheet for battery cells; and pressing the fixed pouch film with a punch unit to form a storage part, wherein the punch unit includes a central punch unit and an outer peripheral punch unit surrounding the central punch unit, wherein in the step of forming the storage part, the central punch unit presses the central portion of the pouch film, and the outer peripheral punch unit presses the outer peripheral portion of the pouch film, and wherein in a vertical cross section parallel to the pressing direction of the punch unit, a radius of curvature of the corner of the central punch unit is larger than a radius of curvature of the corner of the outer peripheral punch unit.

10. The method for manufacturing a pouch case according to claim 9, wherein:

in a horizontal cross section perpendicular to the pressing direction of the punch unit, the radius of curvature of the corner of the central punch unit is larger than the radius of curvature of the corner of the outer peripheral punch unit.

11. The method for manufacturing a pouch case according to claim 9, wherein:

in the step of forming the storage part, first, the central punch unit presses the central portion of the pouch film, and then afterwards the outer peripheral punch unit presses the outer peripheral portion of the pouch film.

12. The method for manufacturing a pouch case according to claim 9, wherein:

the outer peripheral punch unit includes a plurality of units, and in a horizontal cross section perpendicular to the pressing direction of the punch unit, the plurality of the outer peripheral punch units are sequentially disposed from the central punch unit to an outside.

13. The method for manufacturing a pouch case according to claim 12, wherein:

in the step of forming storage part, among the plurality of the outer peripheral punch units, an outer peripheral punch unit located closer to the central punch unit presses the pouch film before an outer peripheral punch unit located further from the central punch unit.

* * * * *